UNITED STATES PATENT OFFICE.

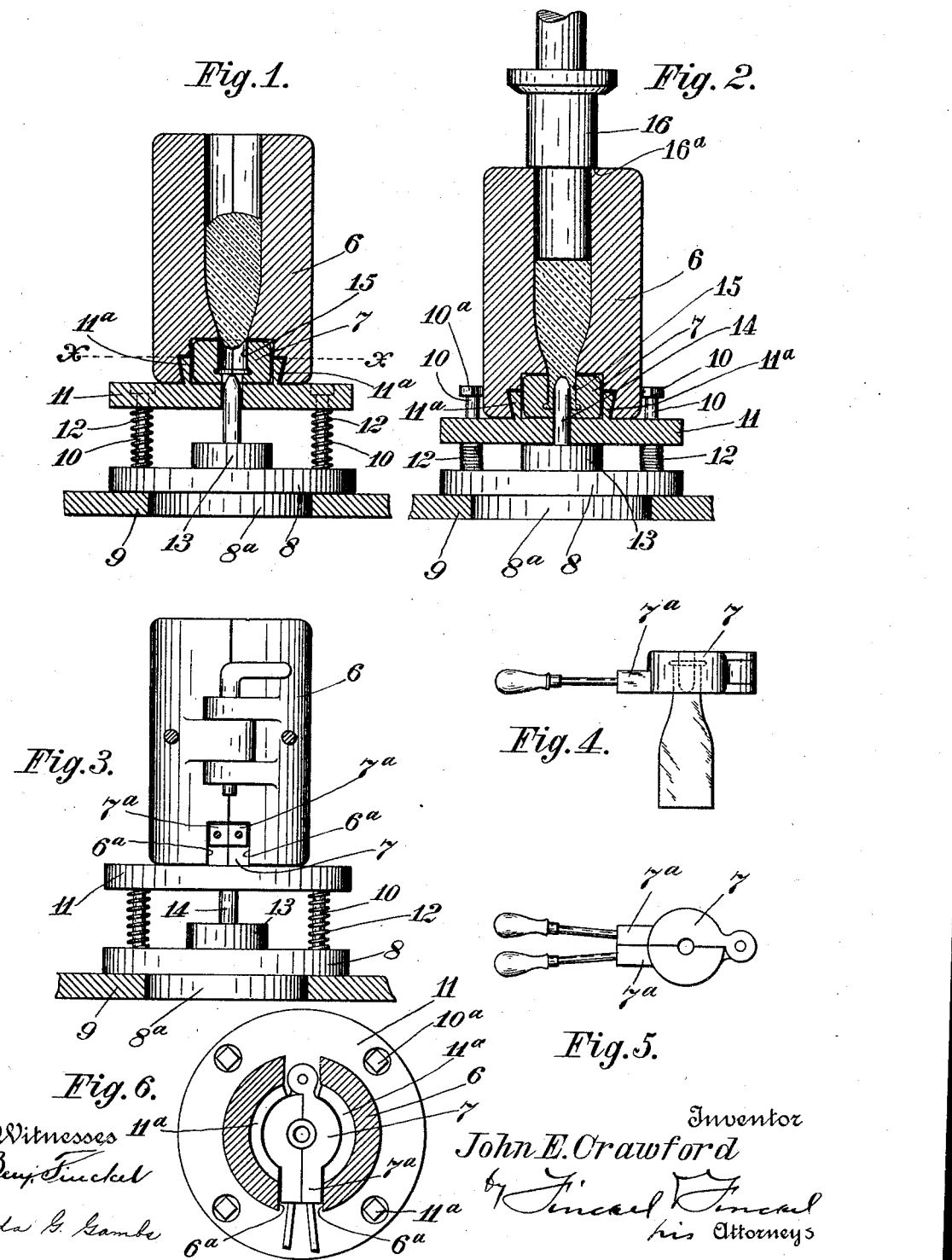

JOHN E. CRAWFORD, OF COLUMBUS, OHIO.

GLASS-MOLDING APPARATUS.

1,115,785.

Specification of Letters Patent. Patented Nov. 3, 1914.

Application filed February 24, 1909. Serial No. 479,805.

*To all whom it may concern:*

Be it known that I, JOHN E. CRAWFORD, a citizen of the United States, residing at Columbus, in the county of Franklin and State of Ohio, have invented a certain new and useful Improvement in Glass-Molding Apparatus, of which the following is a specification.

The object of this invention is to provide improved simplified and effective means for forming the cork seat and neck of a bottle or analogous vessel preparatory to blowing the body of the bottle to its final form.

The invention is embodied in the construction hereinafter set forth and claimed, the invention not being confined to precisely the forms of the parts shown.

In the accompanying drawings—Figure 1 is generally a central vertical section with parts in full, showing a charge of glass in the preliminary mold and before the plunger or compressor has descended into said mold. Fig. 2 is a similar view showing the plunger in descended position. Fig. 3 is a front elevation to show how the neck mold is locked in the body mold. Fig. 4 shows the neck ring or mold containing a preliminarily molded bottle or blank removed from the body mold. Fig. 5 is a top plan view of the neck mold. Fig. 6 is a horizontal section on the line $x$—$x$, Fig. 1.

The body mold 6 as usual comprises two sections hinged together with means for manipulating them, but in the present instance the sections are cut out at their front lower corners, as seen at 6ª, to provide room for lugs on the neck mold. The neck ring or mold 7 is composed of two sections hinged together as usual and provided with handles for manipulating them, but in the present instance the ring sections are furnished with a pair of lugs 7ª that stand in the opening formed by the cut away corners at 6ª.

8 designates a base plate of a support for the molds. This base has a lug 8ª at its under side that fits in a hole in a table 9. The base plate 8 has secured to its upper side guiding bolts 10 having heads or stops 10ª at their upper ends and sliding on said bolts is a plate 11 normally held up against the stops 10ª by springs 12 around the bolts between the plates 8 and 11. On the center of the base plate 8 is a boss 13 from the center of which projects upwardly a stem 14 of a diameter and form to form the proper cork seat or interior of the neck of the bottle. The stem 14, is, of course, of smaller diameter than the diameter of the cavity 15 in the neck mold that forms the exterior of the neck of the bottle. It will be observed that the stem 14 projects into the neck mold above the plane of the lower end of the body mold so that both the neck mold and stem are within the body mold and it can be correctly said that the stem enters both molds. The upper side of the cushioned plate 11 is furnished with arc shaped ribs 11ª, 11ª, and under-cut around their outer sides and the interior of the body mold sections are correspondingly formed to fit onto said ribs so that when said body mold sections are closed and latched together they are locked from movement in any direction with reference to said plate 11. The ribs 11ª, 11ª, form between them a neck-mold seat, and when the neck mold ring sections are properly seated in their seat and the body mold sections closed in place the neck mold sections are locked closed by the engagement of the body mold sections with the lugs 7ª.

16 designates a plunger for compressing the glass in the body and neck molds. The plunger has a shoulder 16ª to limit its movement into the body mold, and the boss 13 around the base of the stem 14 limits the downward movement of plate 11.

In practice a chunk of hot soft glass is put into the body approximately as seen in Fig. 1. The descent of the plunger 16 forces down both molds and the plate 11 so that the glass is compressed into the cavity of the neck mold and around the upper end of the stem or pin 14. When the plunger is raised the springs under the plate 11 automatically lift the molds and the molded glass off the pin, the molded glass retaining the impress of the pin. After this operation the body mold is opened, the molded blank taken out by the neck mold ring as seen in Fig. 4 and the glass body taken to a finishing blow mold as is now the common practice.

What I claim is:

1. In an apparatus for making bottle blanks, a press mold open at both ends, mounted to move in the direction of its axis and placed with the bottom end up, a neck mold, an upright internal former supported in the line of the axis of the neck, and means entering the bottom end of the press mold to compress the charge and move the molds downward along the line of the axis, causing the former to enter both molds to form the bottle neck.

2. In an apparatus for making bottle blanks, a press mold open at both ends, mounted to move in the direction of its axis and placed with its bottom end up, a separate neck mold, an internal former supported in line with the neck, and means entering the bottom end of the mold to compress the charge and move the molds along the line of the axis toward the former, causing the latter to enter both molds to form the bottle neck, and means for returning the press and the neck molds to normal position.

3. In an apparatus for making bottle blanks, a press mold open at both ends, mounted to move in the direction of its axis and placed with its bottom end up, a separate neck mold, an internal former supported in line with the neck, and means entering the bottom end of the mold to compress the charge and move the mold along the line of its axis toward the former, causing the latter to enter both molds to form the bottle neck, and yielding means for returning the mold and withdrawing the former.

4. In an apparatus for making bottle blanks, a press mold open at the bottom to receive the gather and placed with the neck downward, a plunger to enter the bottom of the press mold, a neck mold, yielding means for supporting the press mold and neck mold in normal position, an upright, stationary, internal neck former, and means for pressing the plunger downward to compress the gather, driving the press mold downward over the former, the latter passing through the neck mold and entering the press mold.

5. In an apparatus for making bottle blanks, a press mold open at the bottom to admit the gather and mounted to move in the direction of its axis, a neck mold coöperating with the press mold, an internal former, a plunger to enter the opening in the bottom of the mold, means for pressing the plunger toward the interior of the press mold, whereby the press mold is moved to a position inclosing the former and the former is passed through the neck mold and caused to enter the neck of the press mold, and yielding means tending to return the press mold to normal position.

6. In an apparatus for making bottle blanks, a mold open at the neck and bottom, mounted to move in the direction of its axis, an internal former supported in line with the neck of the mold, means for closing the bottom of the mold, and means for moving the mold to cause the former to enter the neck of the mold, compressing the glass and forming the bottle neck.

JOHN E. CRAWFORD.

Witnesses:
  BENJ. FINCKEL,
  WM. SCHOBERTH.